US010148177B2

(12) United States Patent
Herzer et al.

(10) Patent No.: US 10,148,177 B2
(45) Date of Patent: Dec. 4, 2018

(54) MULTIPHASE CONVERTER WITH PHASE INTERLEAVING

(71) Applicant: Texas Instruments Incorporated, Dallas, TX (US)

(72) Inventors: Stefan Herzer, Marzling (DE); Michael Couleur, Munich (DE); Antonio Priego, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/392,074

(22) Filed: Dec. 28, 2016

(65) Prior Publication Data

US 2018/0183332 A1    Jun. 28, 2018

(51) Int. Cl.
*H02M 3/158*    (2006.01)

(52) U.S. Cl.
CPC .......... *H02M 3/158* (2013.01); *H02M 3/1584* (2013.01)

(58) Field of Classification Search
CPC .... H02M 3/156; H02M 3/158; H02M 3/1588; H02M 3/155; H02M 3/1582; H02M 3/157; H02M 3/1563; H02M 2003/1566; H02M 2003/1557; H02M 2001/0012; H02M 2001/0009
USPC ................................. 323/271, 280–285, 272
See application file for complete search history.

(56) References Cited

U.S. PATENT DOCUMENTS

| 2008/0238390 A1* | 10/2008 | Trivedi | H02M 3/1584 323/283 |
| 2012/0153916 A1* | 6/2012 | Weinstein | H02M 3/07 323/283 |
| 2014/0306680 A1* | 10/2014 | Liu | G05F 1/468 323/288 |
| 2015/0015219 A1* | 1/2015 | Ishino | H02M 3/1584 323/271 |

* cited by examiner

*Primary Examiner* — Timothy J Dole
*Assistant Examiner* — Bryan R Perez
(74) *Attorney, Agent, or Firm* — Tuenlap D. Chan; Charles A. Brill; Frank D. Cimino

(57) ABSTRACT

A multi-phase power converter includes a plurality of power channels arranged in parallel to drive an output of the power converter, and a channel selection circuit. Each of the power channels includes a driver, a feedback control circuit coupled to an output of the driver, and a comparator coupled to the feedback control circuit. The channel selection circuit is coupled to the feedback control circuit of each of the power channels. The channel control circuit is configured to: select a different specific one of the power channels to activate in each of a plurality of phases, and introduce an offset voltage into each of the feedback control circuits, except the feedback control circuit of the specific one of the power channels. The feedback control circuit is configured to apply the offset to bias driver output feedback voltage away from a threshold voltage at which the power channel is activated.

17 Claims, 6 Drawing Sheets

MULTIPHASE CONVERTER WITH PHASE INTERLEAVING

BACKGROUND

DC-to-DC converters are generally switch-mode power supplies that convert one DC voltage to another. Some DC-to-DC converters, step-up converters, generate a higher voltage from a lower input voltage, and other DC-to-DC converters, step-down converters, generate a lower voltage from a higher input voltage. One type of step-down switch mode power supply is known as a Buck converter.

A switching power supply typically includes an energy-storage inductor, and a regulation system in which a control element, for example, a transistor switch, is rapidly switched on and off. Pulses for switching the transistor on and off may be produced by an oscillator/error amplifier/pulse-width modulator network. While the transistor is switched on, energy may be pumped into the inductor and stored in a magnetic field. When the transistor is switched OFF, the energy stored in the inductor is directed into a filter and load. Filter output may be provided to an error amplifier that controls generation of pulses for switching the transistor on and off.

Multiphase power conversion is an improvement over single phase conversion. A multiphase converter includes a number of parallel power stages that drive a common load. By phase shifting the control signals to the converter power stages the multiphase converter provides several advantages over a single power stage including lower current ripple on the input and output capacitors, faster transient response to load steps, improved power handling capabilities, and higher system efficiency. Multiphase converters distribute the power and load current, which results in smaller and lower cost transistors with fewer input and output capacitors.

SUMMARY

A multi-phase power converter applying single pulse frequency modulation is disclosed herein. In one embodiment, a multi-phase power converter includes a plurality of power channels arranged in parallel to drive an output of the power converter, and a channel selection circuit. Each of the power channels includes a driver, a feedback control circuit coupled to an output of the driver, and a comparator coupled to the feedback control circuit. The channel selection circuit is coupled to the feedback control circuit of each of the power channels. The channel selection circuit is configured to: select a different specific one of the power channels to activate in each of a plurality of phases, and introduce an offset voltage into each of the feedback control circuits, except the feedback control circuit of the specific one of the power channels. The feedback control circuit is configured to apply the offset to bias driver output feedback voltage away from a threshold voltage at which the power channel is activated.

In another embodiment, a multi-phase power converter includes a plurality of power channels arranged in parallel to be sequentially activated to drive an output of the power converter. Each of the power channels includes a driver, a comparator, and a delay-locked loop (DLL). The driver is coupled to the output of the power converter. The comparator is coupled to the driver. The DLL is coupled to the comparator. The DLL is configured to generate an offset to adjust a threshold of the comparator; and to generate a timing reference for one of the power channels to be next activated.

In a further embodiment, a multi-phase power converter includes a plurality of power channels arranged in parallel to drive an output of the power converter, and a channel selection circuit. Each of the power channels includes a driver, a feedback control circuit, a comparator, and a DLL. The feedback control circuit is coupled to an output of the driver. The comparator is coupled to the feedback control circuit. The DLL is configured to: generate an offset to adjust a threshold of the comparator; and to generate a timing reference for one of the power channels to be next activated. The channel selection circuit is coupled to the feedback control circuit of each of the power channels. The channel selection circuit configured to: select a different specific one of the power channels to activate in each of a plurality of phases; and to cause each of the feedback control circuits, except the feedback control circuit of the specific one of the power channels, to introduce an offset voltage to bias driver output feedback voltage away from a threshold voltage at which the power channel is activated.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

Multiphase power converters are often run in a pulse frequency modulation (PFM) mode. In PFM mode, pulses are generated by each stage or channel of the converter, thereby multiplying the load range over which the system operates in PFM mode by the number of phases and achieving a flat efficiency characteristic over a wide range of loads.

However, use of several stages in PFM mode requires regulation of the phase relationship between the stages so that activation of the stages is equally spread in time and output voltage ripple is not increased.

In the multiphase power converter disclosed herein, a channel selection circuit applies a first offset voltage to inhibit pulse generation in all but a selected one of the power stages. Each of the power stages includes a delay locked loop (DLL) that adjusts the offset of the power stage modulator when the power stage is enabled by the channel selection circuit to regulate the phase spreading of the modulator outputs.

Figure 1:
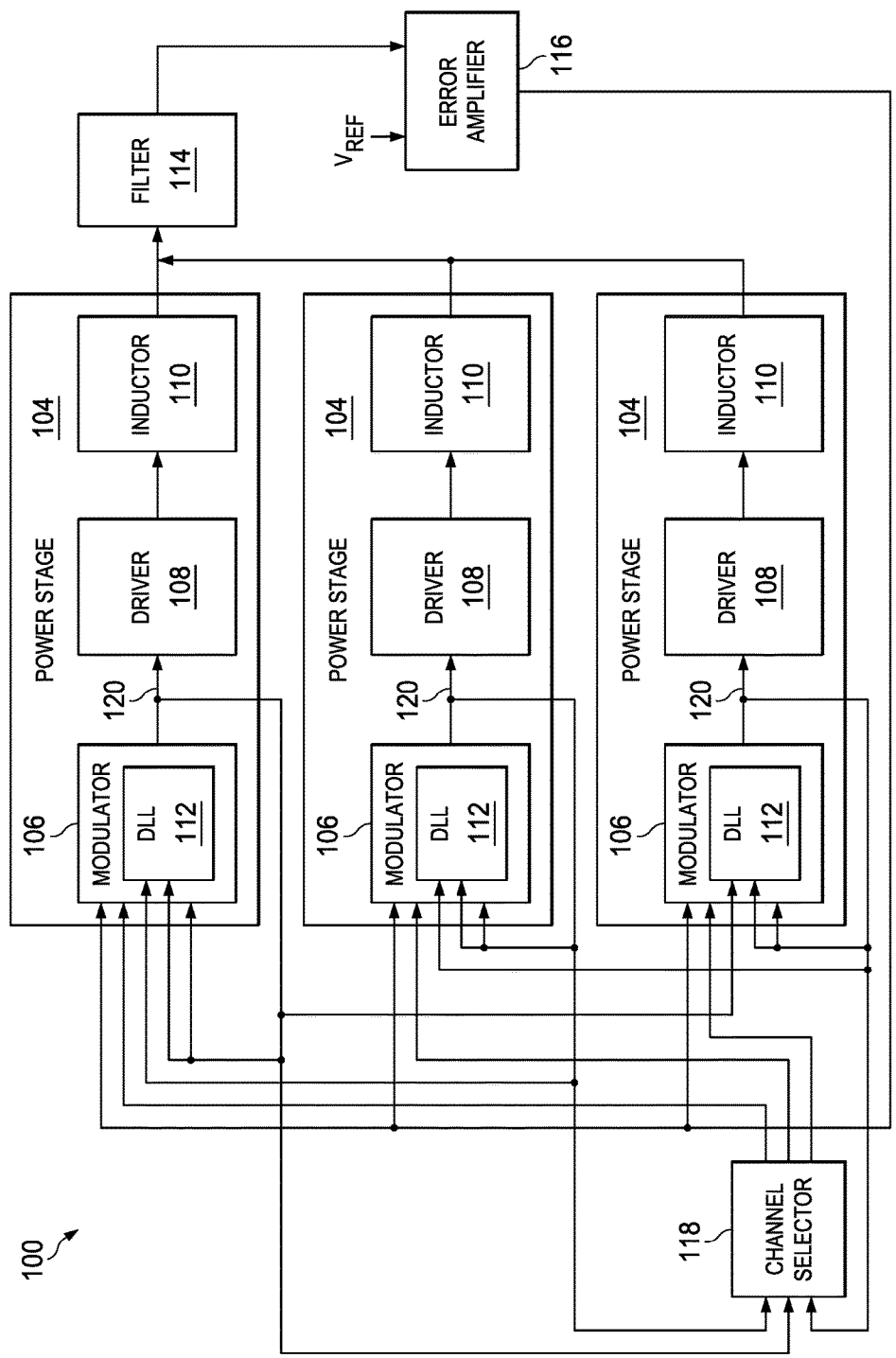
FIG. 1 shows a block diagram for a multiphase power converter in accordance with various embodiments.

FIG. 1 shows a block diagram for a multiphase power converter 100 in accordance with various embodiments. The power converter 100 includes a plurality of parallel power stages (or channels, also referred to as phases) 104, an output filter 114, an error amplifier 116, and a channel selector 118. While three parallel power stages 104 are illustrated in the embodiment of the power converter 100 shown in FIG. 100, other embodiments of the power converter 100 may include any number of parallel power stages 104. The power stages 104 are coupled to and source current to the output filter 114. The output filter 114 is a low pass filter that is coupled to a load. In some embodiments, the output filter 114 may include an inductor 110 of each power stage 104 and a capacitor to form a second order low pass filter. The error amplifier 116 is coupled to the output filter 114. The error amplifier 116 compares the voltage provided to the load by the output filter 114 to a reference voltage.

The channel selector 118 is coupled to each of the power stages 104. The channel selector 118 provides an offset adjustment to each of the power stages 104 that effectively enables each of the power stages 104 to generate an output current once in each PFM cycle. The channel selector 118 sequentially selects each of the power stages 104 to generate output current in a PFM cycle. To select a particular power stage 104 to generate current, the channel selector 118 adjusts (e.g., applies a disabling offset to) a feedback voltage in the power stages 104 that are not being selected to generate an output current. By adjusting (e.g., reducing) the feedback voltage in an unselected power stage 104, the channel selector 118 effectively increases the unselected power stage 104 output voltage at which the unselected power stage 104 is activated to generate an output current, thereby reducing the likelihood that the unselected power stage 104 will be activated to generate an output current during the time the offset is applied. However, adjustment of the feedback voltage by the channel selector 118 does not preclude activation of the unselected power stages 104. The unselected power stages 104 may be activated if, for example, the feedback voltage of unselected power stage 104 drops precipitously due a sudden increase in demand for load current.

In some embodiments, an offset adjustment signal provided by the channel selector 118 may shift the feedback voltage of the single selected power stage 104 towards a voltage that activates the power stage 104, while the unselected power stages 104 by default apply a different offset to the feedback voltages that reduces the likelihood of activation of the unselected power stages 104. Alternatively, offset adjustment signals provided by the channel selector 118 may shift the feedback voltages of the unselected power stages 104 towards a voltage that reduces the likelihood of activation of the unselected power stages 104, while the selected power stage 104 by default applies an offset to the feedback voltage that is more likely to activate the power stage 104.

Each of the power stages 104 includes a modulator 106, a driver 108, and an inductor 110. The driver 108 switches current into the inductor 110. The inductor 110 stores energy of the current as a magnetic field for delivery to a load. The modulator 106 generates a drive signal 120 that controls switching of the driver 108. The channel selector 118 may be clocked by or change state based on the output of the modulators 106 that control switching of the drivers 108. For example, the outputs 120 of all of the modulators 106 may be combined (e.g., "or'd") to produce a clock for use by the channel selector 118, where, for example, a selected edge of the clock causes the channel selector 118 to select a next power stage 104 to generate current.

The modulator 106 includes a DLL 112. When the power stage 104 is selected to generate current by the channel selector 118, the DLL 112 adjusts offset in the modulator 106 to regulate phase spreading of the outputs of the modulators 112. The DLL 112 generates a timing reference for a next power stage 104 to be activated based on the switching control signal for the present power stage 104. The DLL 112 additionally generates a frequency proportional current to bias the DLL 112. The DLL 112 also adjusts the offset of the modulator 106 to lock the next power stage 104 to the timing reference generated by the DLL 112. Further details of the DLL 112 are described herein with respect to FIG. 3.

Figure 2:
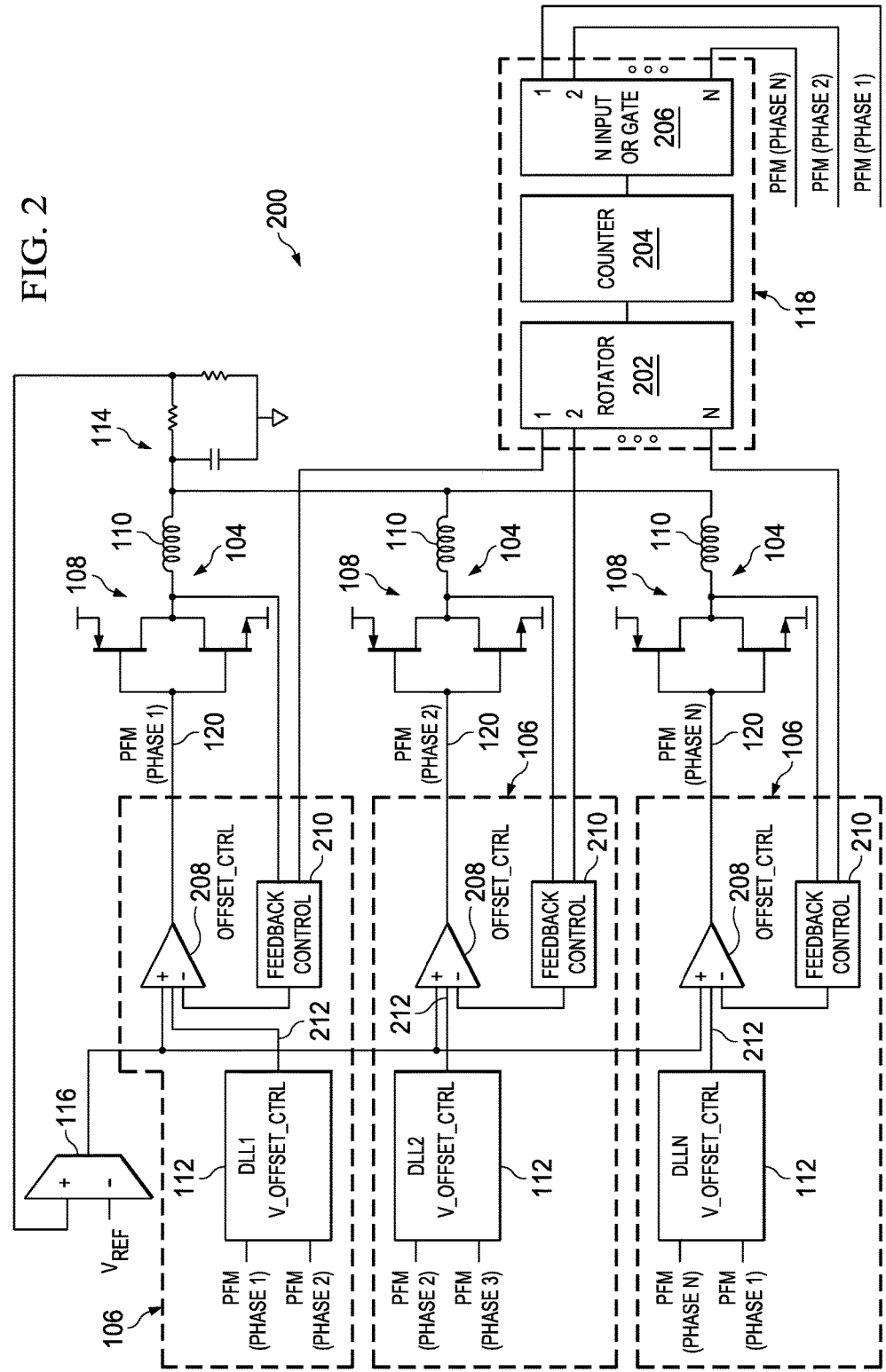
FIG. 2 shows a schematic diagram for a multiphase power converter in accordance with various embodiments.

FIG. 2 shows a schematic diagram for a multiphase power converter 200 in accordance with various embodiments. The power converter 200 is an embodiment of the power converter 100 of FIG. 1, and includes the various components described with respect to the power converter 100. The drivers 108 include stacked transistors. The modulator 106 includes the DLL 112, a comparator 208, and a feedback control circuit 210. The feedback control circuit 210 is coupled to the output of the driver 108, an output of the channel selector 118, and an input of the comparator 208. The feedback control circuit 210, under control of the channel selector 118, shifts the feedback voltage from the driver 108 to enable or disable the power stage 104.

In the power converter 200, the channel selector 118 includes "OR" logic 206, counter 204, and rotator logic 202. The OR logic 206 receives as inputs the output signals 120 of the modulators 106 that control the drivers 108, and combines the modulator output signals 120 to generate a clock signal. The clock signal generated by the OR logic 206 increments the counter 204. The rotator 202 decodes (i.e., demultiplexes) the output of the counter 204 to generate the signals that sequentially enable each of the power stages. In other embodiments, the channel selector 118 may be implemented differently. For example, rather than the counter 204 and rotator 202, an embodiment may include a shifter that cycles a single bit through the shifter's stages responsive to the output of the OR logic.

As in the power converter 100, each modulator 106 includes a DLL 112. The DLL 112 receives as input the signal that controls the driver 108 in each of two sequentially activated power stages 104. That is, the DLL 112 of a given modulator 106 receives as input the driver control signal 120 produced by the given modulator 106, and the driver control signal 120 produced by the modulator 106 to be next activated after the given modulator 106. The DLL 112 generates a control signal 212 that adjusts the offset in the comparator 208. By adjusting the offset in the comparator 208, the DLL 112 can adjust the timing of the driver control signal generated by the comparator 208, and as a result, lock the timing of the driver control signal 120 generated by the next activated modulator 106 to the DLL 112.

Figure 3:
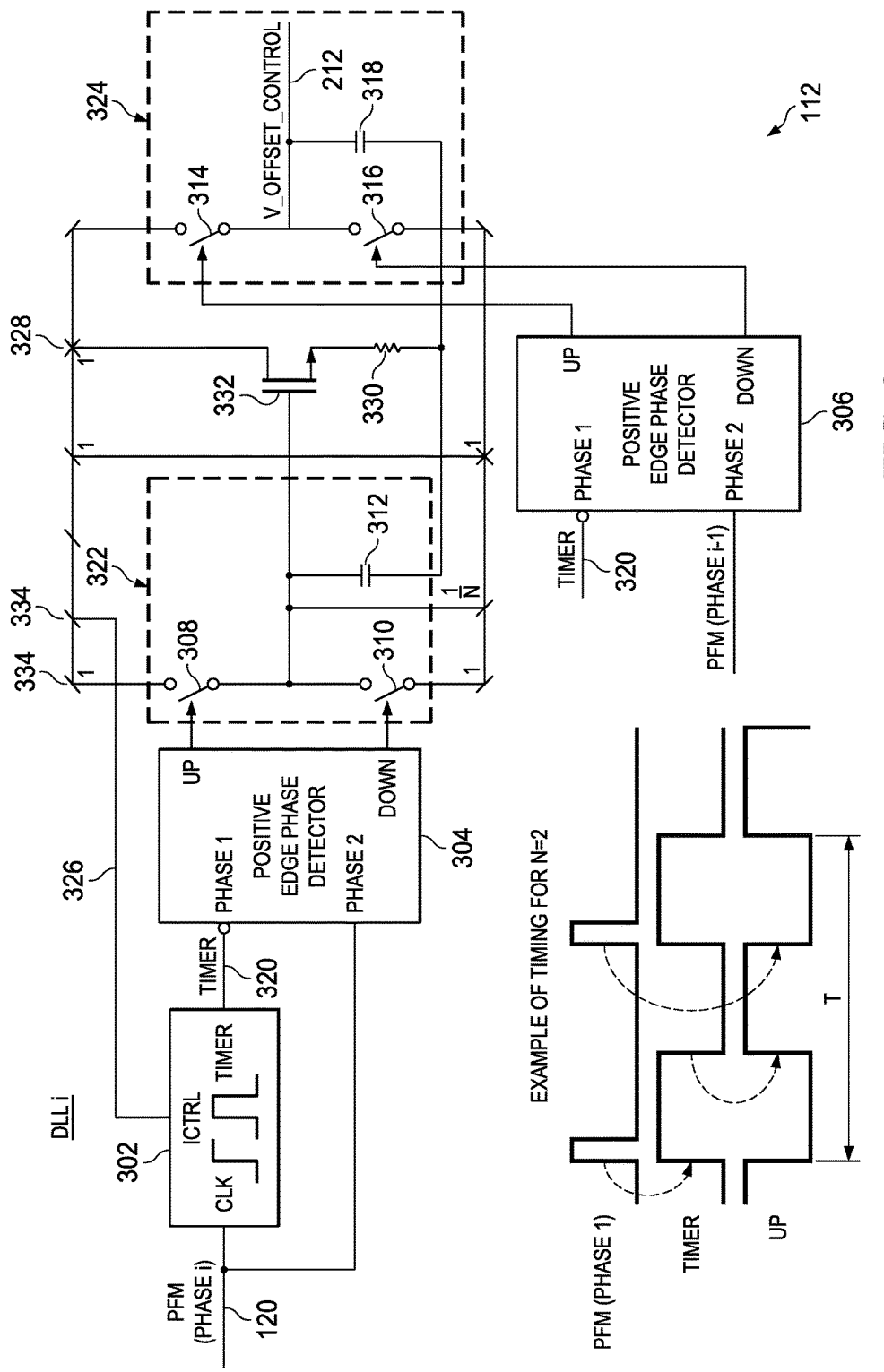
FIG. 3 shows a schematic diagram for phase control in a modulator of a multiphase power converter in accordance with various embodiments.

FIG. 3 shows a schematic diagram for the DLL 112 in a modulator 106 of a multiphase power converter 100 in accordance with various embodiments. The DLL shown in FIG. 3 is labeled DLL i, wherein i is an index value for the power stages 104 (e.g., i=1 . . . N, where N is the total number of power stages 104). The DLL 112 includes a current controlled monostable (pulse generator) 302, a first phase detector 304, a first charge pump 322, a second phase detector 306, and a second charge pump 324. The first charge pump 322 includes switches 308 and 310, and capacitor 312. The second charge pump 324 includes switches 314 and 316, and capacitor 324. In FIG. 3, the slash symbols 334 represent connections to a current mirror (not shown) and a alphanumeric value (e.g., 1, 1/N) adjacent to the slash symbol indicates a ratio of current of the mirror current, where N corresponds to the number power stages 104 in the converter 100. Crossed slashes 328 represent a diode. The monostable 302 receives as input the driver control signal 120 generated by the modulator 106. An edge (e.g., the leading edge) of the driver control signal 120 triggers the monostable 302 to generate a pulse 320 (TIMER). The pulse 320 represents the delay between two sequentially selected power stages 104. The phase detector 304 compares the trailing edge of the pulse 320 to the leading edge (e.g., the rising edge) of the driver control signal 120 that triggered the monostable 302. The phase detector 306 generates UP and DN signals based on the relative locations of the compared edges. The UP and DN signals drive the switches 308 and 310 of the first charge pump to charge the capacitor 312. The capacitor 312 is offset by a current, $I_{offset}$:

$$I_{offset} = \frac{I_{bias}}{N}$$

where:

$I_{bias}$ is the charge pump bias current; and
N is the number of parallel power stages 104 in the power converter 100.

The top plate voltage of the capacitor 312 drives the gate of transistor 332 to produce a modulator control current 326 that is fed back to the monostable 302 to control the length of the pulse 320. The resistor 330 sets the gain for voltage to current conversion. The loop formed by the monostable 302, the phase detector 304 and the charge pump 322 locks when:

$$T_{UP}I_{bias} - T_{DN}I_{bias} = I_{offset}T$$

where:

$T_{UP}$ is the time that the phase detector 304 asserts the UP signal in a PFM period;
$T_{DN}$ is the time that the phase detector 304 asserts the DN signal in a PFM period;
T is the PFM period; and
N is the number of parallel power stages 104 in the power converter 100.

Because the phase detector 304 generates only one of the UP signal or the DN signal in a PFM period, equilibrium is reached when:

$$T_{UP} = \frac{T}{N}.$$

As $T_{UP}$ represents the time between the falling edge of the pulse 320 in a given power stage 104 and activation of a next power stage 104, the circuit will lock when the PFM pulse (i.e., the control signal 120 to the driver 108) of the next power stage 104 is triggered when the (N−1)/N of the given power stage 104 is achieved. Thus, the DLL 112 creates a time reference on which the timing of the next power stage 104 is locked.

The second phase detector 306 receives as inputs the pulse 320 generated by the monostable 302 and the control signal 120 from the next activated power stage 104. The UP and DN outputs of the phase detector 306 respectively drive the switches 314 and 316 of the charge pump 324 to charge the capacitor 318. The voltage on the top plate of the capacitor 318 is provided to the comparator 208 to adjust the modulator offset of the power stage 104 and thereby lock the next power stage 104 to the pulse 320 generated by the monostable 302.

By including a DLL 112 in the modulator 106 of each power stage 104, in embodiments of the power converter 100 the power phases 104 are locked to an equally spread phase angle. Furthermore, because the DLL 112 is a single pole system, it is stable as long as the bandwidth of the DLL 112 is smaller than the switching frequency of the power converter 100. Because the PFM frequency may vary over several decades, embodiments self-bias the DLL 112 with the frequency proportional current that controls the current controlled monostable 302 to adjust bandwidth of the DLL 112 with switching frequency.

Figure 4:
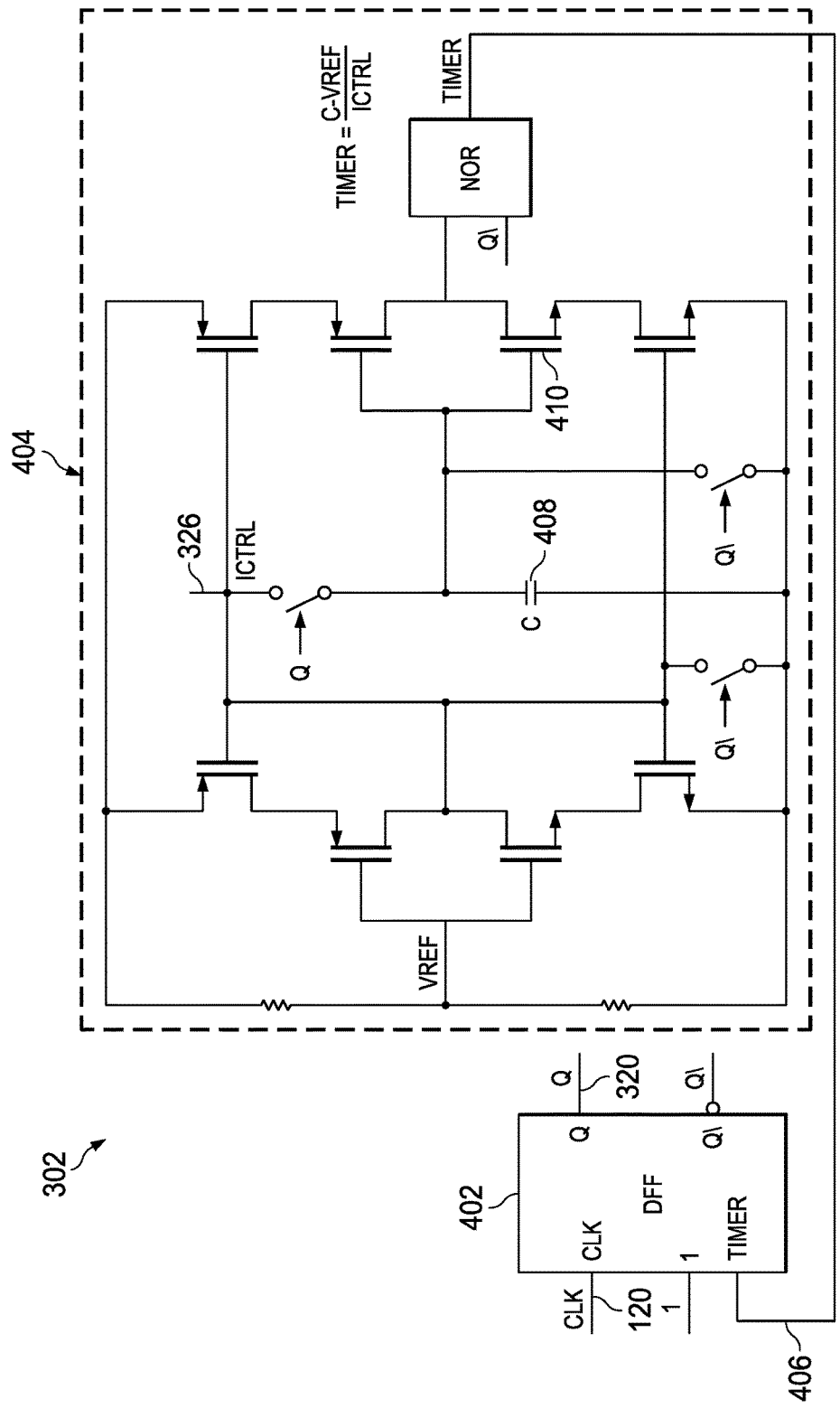
FIG. 4 shows a schematic diagram for a monostable used in phase control in a modulator of a multiphase power converter in accordance with various embodiments.

FIG. 4 shows a schematic diagram for an embodiment of the monostable 302 that can be used in the DLL 112. The monostable 302 includes a flip-flop 402 and flip-flop reset circuit 404. The flip-flop 402 is set by an edge of the signal 120 to produce the leading edge of the pulse 320. Setting the flip-flop 402 activates the flip-flop reset circuit 404 to generate a reset signal 406 to reset the flip-flop 402. In the reset circuit 404, while the flip-flop 402 is set, the modulator control current 326 generated by the DLL 112 charges the capacitor 408. When the voltage on the top plate of the capacitor 408 exceeds the threshold voltage of the transistor 410 the reset signal 406 is asserted to reset the flip-flop 402 and generate the trailing edge of the pulse 320. More specifically, the reset timing may be defined as:

$$\text{TIMER} = \frac{C * V_{REF}}{I_{CNTRL}}$$

where:

C is the capacitance of capacitor 408;
$V_{REF}$ is a reference voltage (e.g., ½ of the power supply voltage powering in the monostable 302; and
$I_{CNTRL}$ is the monostable control current 326.

The capacitor 408 is discharged while the flip-flop 402 is reset. Thus, the monostable 302 generates the pulse 320 with a duration that is a function of the monostable control current 326.

Figure 5:
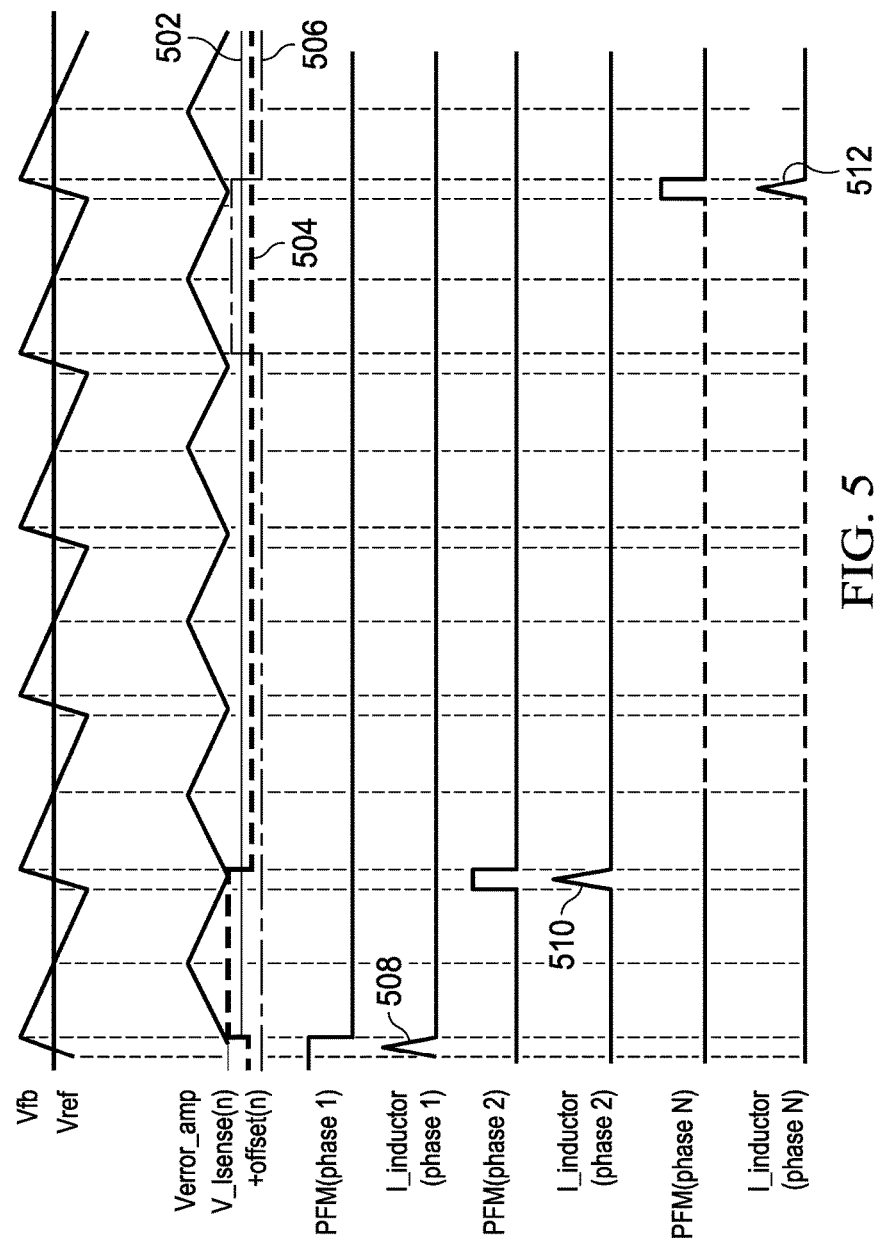
FIG. 5 shows a diagram of signals in a multiphase power converter including offset to control selection of power converter channels in accordance with various embodiments.

FIG. 5 shows a diagram of signals in a multiphase power converter 100 including offset to control selection of power converter stages 104 in accordance with various embodiments. In FIG. 5, three offset adjusted sense signals 502, 504, and 506 are illustrated. Each of the offset adjusted sense signals 502, 504, and 506 corresponds to one of the power stages 104 of the power converter 100, and is produced by combining feedback from a driver 108 of the power converter 100 with an offset adjustment signal generated by the channel selector 118. The channel selector 118 generates a separate and distinct offset adjustment signal for each power stage 104. In each PFM phase, the offset adjustment signals produced by the channel selector 118 adjust the feedback signals such that the feedback signals is are likely to activate only one of the power stages 104 to generate an output current. Such operation is shown in FIG. 5, where at a given time (i.e., in each phase) only one the power stages 104 drives current into the inductor 110. At 508, a first offset adjusted sense signal 502 allows a first power stage 104 to produce an output current. At 510, a second offset adjusted sense signal 504 allows a second power stage 104 to produce an output current. At 512, a third offset adjusted sense signal 506 allows a third power stage 104 to produce an output current. While the offset adjusted sense signals 502, 504, 506 make it likely that only one of the power stages 104 will be activated, more than one of the power stages 104 may be activated in a phase if power converter output voltage drops precipitously. Thus, embodiments of the power converter 100 provide multiphase PFM operation while allowing each power stage 104 to autonomously respond to a sudden need for increased current.

Figure 6:
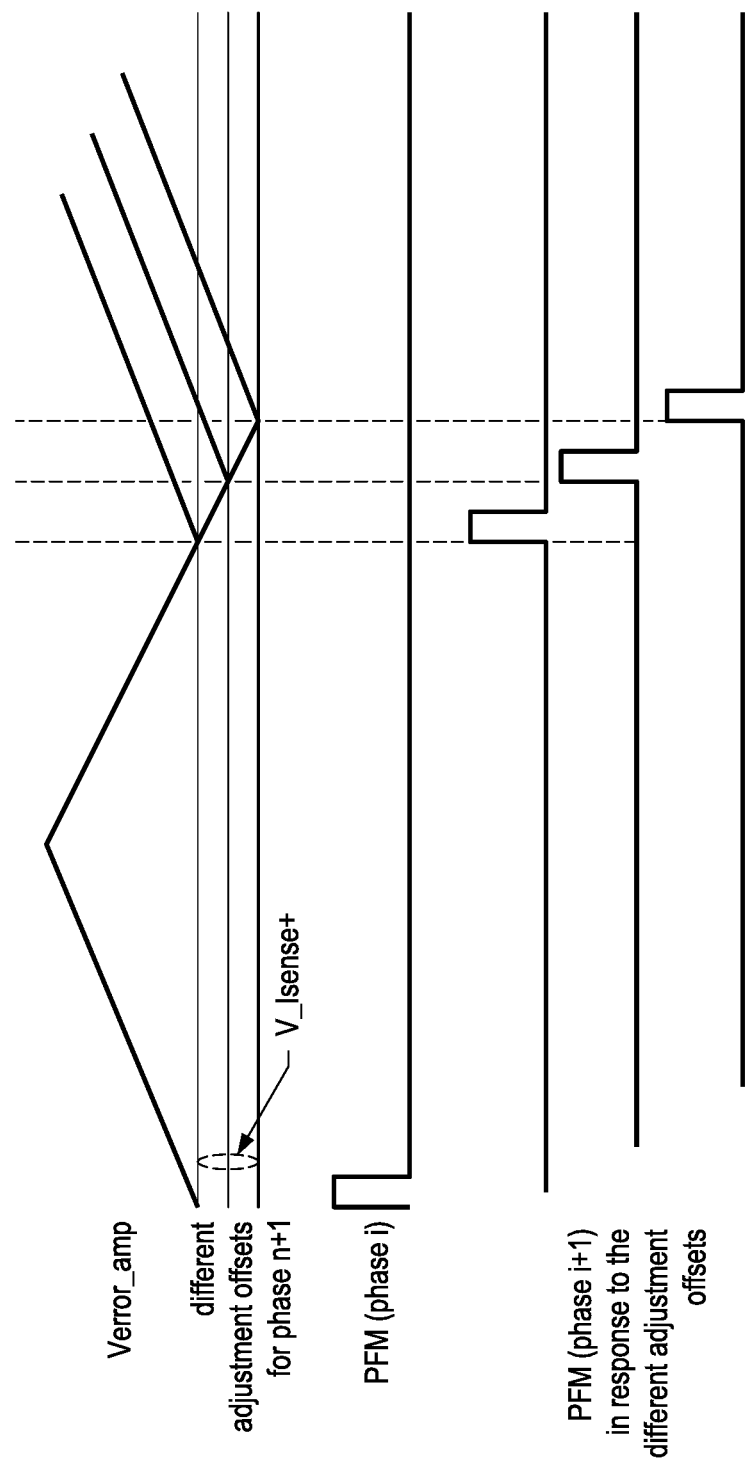
FIG. 6 shows a diagram of signals in a multiphase converter including phase timing adjustment in accordance with various examples.

FIG. 6 shows a diagram of signals in a multiphase converter 100 including phase timing adjustment in accordance with various embodiments. In each modulator 106, the DLL 112 generates an offset control signal 212 that is provided to the comparator 208. Change in the voltage of the offset control signal 212 changes the assertion timing of the driver control signal 120 for the power stage 104. In FIG. 6, three different voltage values for the offset control signal 212 are shown and corresponding changes in the timing of the driver control signal 120 are shown.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A multi-phase power converter, comprising:
an output terminal;
a plurality of power channels arranged in parallel and coupled to the output, each of the power channels comprising:
a driver having a driver output;
a feedback control circuit coupled to the driver output, and configured to generate a feedback voltage based on the driver output and only upon receiving an enable signal; and
a comparator coupled to receive an error voltage, the feedback voltage, and an offset voltage, and configured to generate a pulse frequency modulation (PFM) signal based on a comparison between the error voltage and the feedback voltage adjusted by the offset voltage, wherein the offset voltage is based on a PFM offset between two of the plurality of power channels; and
a channel selection circuit configured to sequentially generate the enable signal to one of the plurality of power channels in each of a plurality of phases.

2. The multi-phase power converter of claim 1, wherein:
the plurality of power channels includes a first power channel configured to receive a first offset voltage of the offset voltage and a second power channel configured to receive a second offset voltage of the offset voltage, the second offset voltage higher than the first offset voltage;
the first power channel is configured to be activated by a first feedback voltage of the feedback voltage; and
the second power channel is configured to be activated by a second feedback voltage of the feedback voltage, the second feedback voltage higher than the first feedback voltage.

3. The multi-phase power converter of claim 1, wherein each of the power channels comprises a delay-locked loop (DLL) coupled to the comparator, the DLL configured to generate the offset voltage to adjust a threshold of the comparator, the DLL comprising a first stage and a second stage.

4. The multi-phase power converter of claim 3, wherein the first stage is configured to generate a timing reference for a power channel to be next selected by the channel selection circuit and a frequency proportional current to bias the DLL, the first stage comprising:
a current controlled monostable triggered by a driver control pulse for the power channel;
a phase detector configured to compare a trailing edge of an output of the monostable and a leading edge of a driver control pulse for the power channel; and
a charge pump configured to provide an output to control the monostable.

5. The multi-phase power converter of claim 4, wherein the second stage is configured to generate the offset voltage to adjust the threshold of the comparator, the second stage comprising:
a phase detector configured to compare the timing reference and the driver control pulse for a next activated power channel; and
a charge pump configured to provide the second offset voltage to adjust the threshold.

6. The multi-phase power converter of claim 3, wherein each of the DLLs receives as input a driver control pulse for the power channel of the DLL and a driver control pulse for a next power channel to be activated, and wherein the DLLs of the plurality of power channels cooperate to equally spread the driver control pulses for all of the power channels.

7. A multi-phase power converter, comprising:
a plurality of power channels arranged in parallel to be sequentially activated to drive an output of the power converter, each of the power channels comprising:
a driver coupled to the output of the power converter;
a comparator coupled to the driver; and
a delay-locked loop (DLL) coupled to the comparator, the DLL configured to:
generate an offset voltage to adjust a threshold of the comparator, wherein the offset voltage is based on a pulse frequency modulation signal offset between two successive ones of the plurality of power channels, and the offset voltage is indicative of a timing reference for one of the power channels to be next activated.

8. The multi-phase power converter of claim 7, wherein the DLL comprises a first stage and a second stage, wherein the first stage is configured to generate the timing reference, and the first stage comprises:
a current controlled monostable triggered by a driver control pulse for a given one of the power channels;
a phase detector configured to compare a trailing edge of an output of the monostable and a leading edge of a driver control pulse for the given one of the power channels; and a charge pump configured to provide an output to control the monostable.

9. The multi-phase power converter of claim 8, wherein the second stage is configured to generate the offset voltage, and the second stage comprises:
a phase detector configured to compare the timing reference and the driver control pulse for a next activated one of the power channels; and
a charge pump configured to provide the offset voltage to adjust the threshold.

10. The multi-phase power converter of claim 7, wherein each of the DLLs receives as input a driver control pulse for the power channel of the DLL and a driver control pulse for a next power channel to be activated, and wherein the DLLs of the plurality of power channels cooperate to equally spread the driver control pulses for all of the power channels.

11. The multi-phase power converter of claim 7, wherein:
each of the power channels comprises a feedback control circuit coupled to an output of the driver, and configured to generate a feedback voltage based on the driver output only upon receiving an activation signal received from a channel selection circuit; and
the comparator is configured to activate the driver based on a comparison between the adjusted threshold and the feedback voltage.

12. The multi-phase power converter of claim 11, wherein:
the plurality of power channels includes a first power channel configured to receive a first offset voltage of the offset voltage and a second power channel configured to receive a second offset voltage of the offset voltage, the second offset voltage higher than the first offset voltage;
the first power channel is configured to be activated by a first feedback voltage of the feedback voltage; and
the second power channel is configured to be activated by a second feedback voltage of the feedback voltage, the second feedback voltage higher than the first feedback voltage.

13. A multi-phase power converter, comprising:
an output terminal
a plurality of power channels arranged in parallel and coupled to the output terminal, each of the power channels comprising:
a driver having a driver output;
a feedback control circuit coupled to the driver, and configured to generate a feedback voltage based on the driver output only upon receiving an enable signal;
a delay locked loop (DLL) configured to generate an offset voltage based on a pulse frequency modulation signal offset between two successive ones of the plurality of power channels, and the offset voltage indicative of a timing reference for one of the power channels to be next activated; and
a comparator configured to adjust a threshold based on the feedback voltage and the offset voltage, and configured to activate the driver when the threshold is met;
and a channel selection circuit configured to sequentially deliver the enable signal to only one of the plurality of power channels in each of a plurality of phases.

14. The multi-phase power converter of claim 13, wherein the DLL comprises a first stage and a second stage, wherein the first stage is configured to generate the timing signal, and the first stage comprises:
a current controlled monostable triggered by a driver control pulse for a given one of the power channels;
a phase detector configured to compare a trailing edge of an output of the monostable and a leading edge of a driver control pulse for the given one of the power channels; and
a charge pump configured to provide an output to control the monostable.

15. The multi-phase power converter of claim 14, wherein the second stage is configured to generate the offset voltage, and the second stage comprises:
a phase detector configured to compare the timing reference and the driver control pulse for a next activated one of the power channels; and
a charge pump configured to provide the offset voltage to adjust the threshold.

16. The multi-phase power converter of claim 13, wherein each of the DLLs receives as input a driver control pulse for the power channel of the DLL and a driver control pulse for a next power channel to be activated, and wherein the DLLs of the plurality of power channels cooperate to equally spread the driver control pulses for all of the power channels.

17. The multi-phase power converter of claim 13, wherein:
the plurality of power channels includes a first power channel configured to receive a first offset voltage of the offset voltage and a second power channel configured to receive a second offset voltage of the offset voltage, the second offset voltage higher than the first offset voltage;
the first power channel is configured to be activated by a first feedback voltage of the feedback voltage; and
the second power channel is configured to be activated by a second feedback voltage of the feedback voltage, the second feedback voltage higher than the first feedback voltage.

* * * * *